Aug. 5, 1958     W. M. BOCK, JR     2,845,944
HUMIDIFIER
Filed April 5, 1955     3 Sheets-Sheet 1
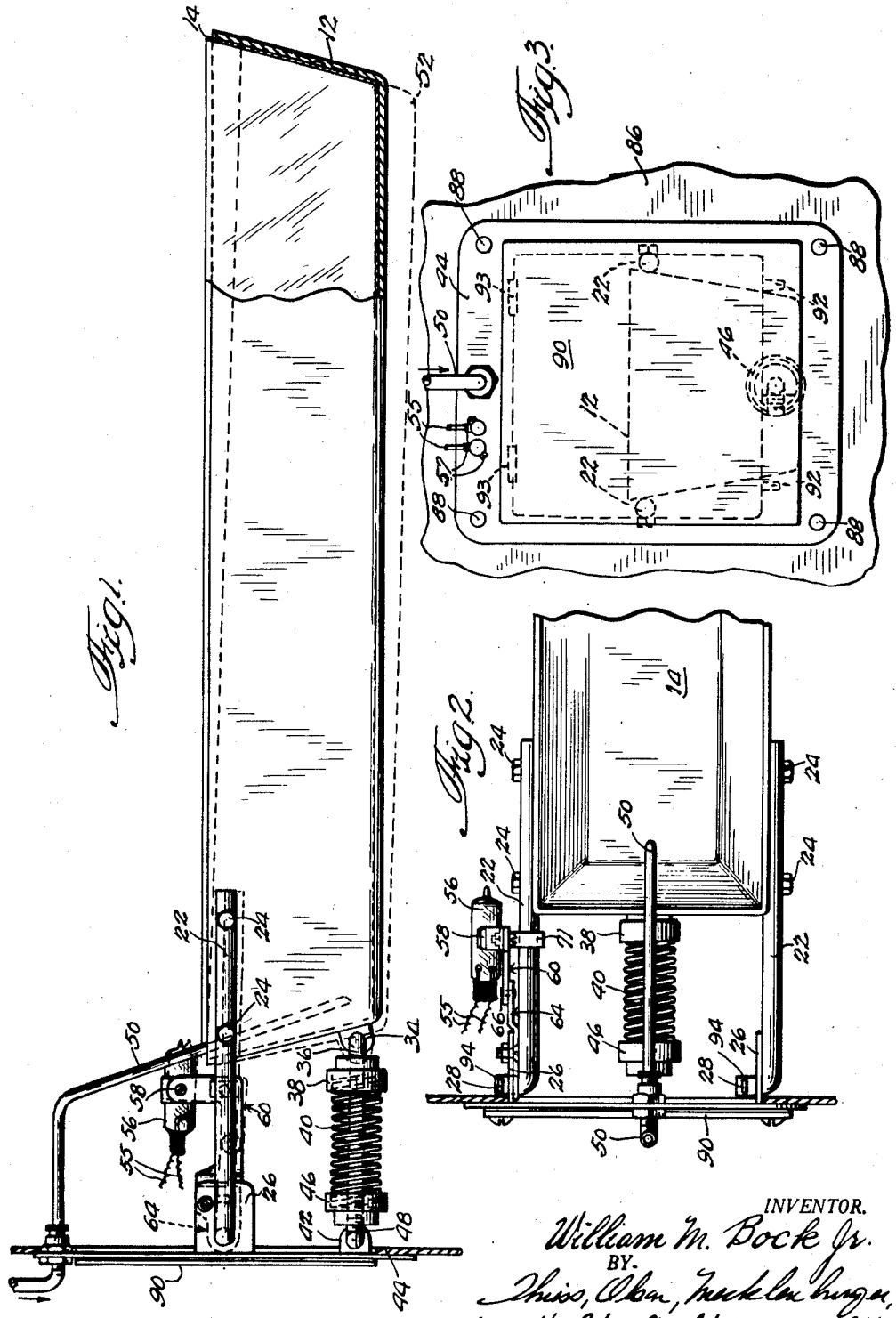
INVENTOR.
William M. Bock Jr.
BY
Thiess, Olsen, Mecklenburger,
van Holst, & Coltman
Attys.

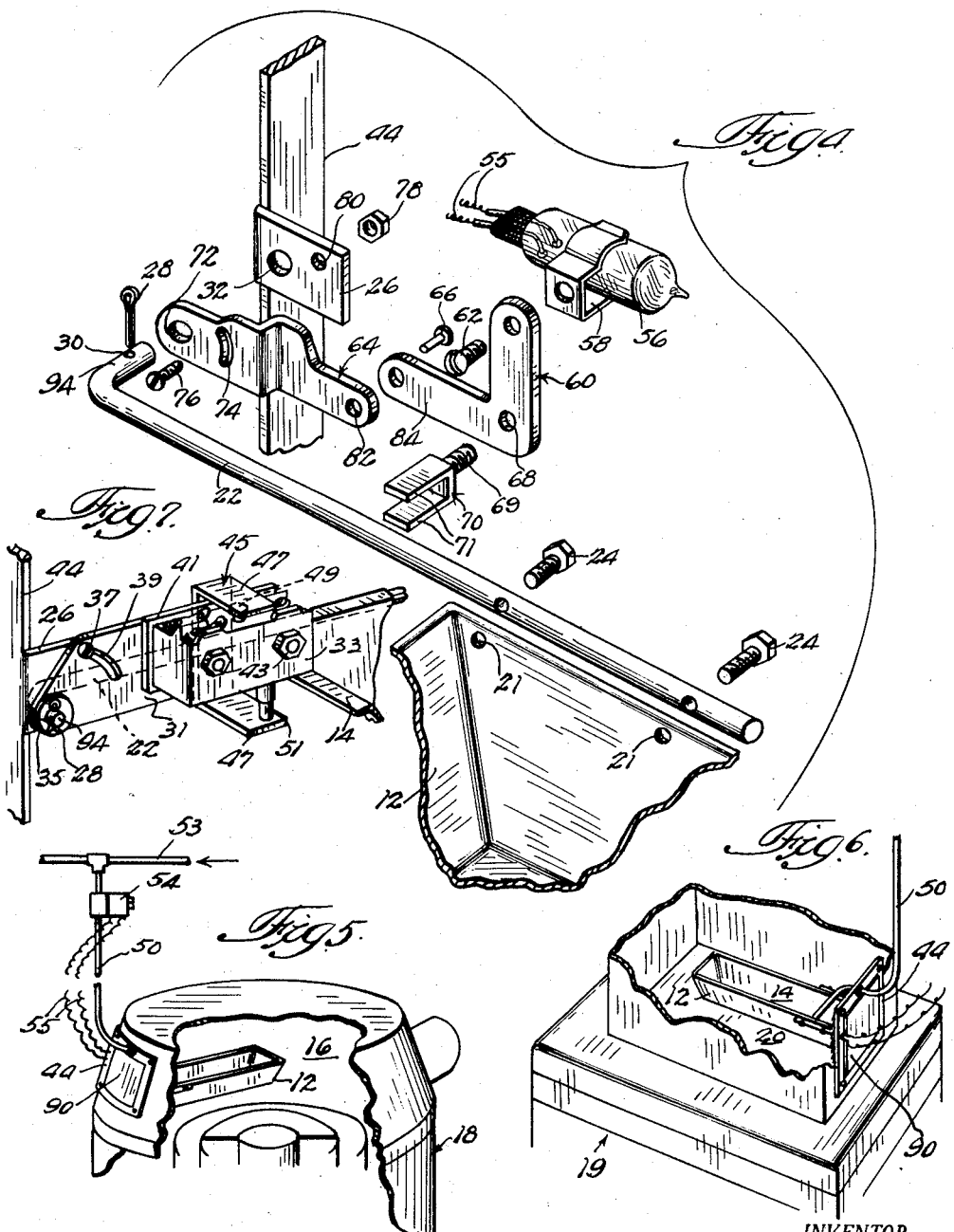

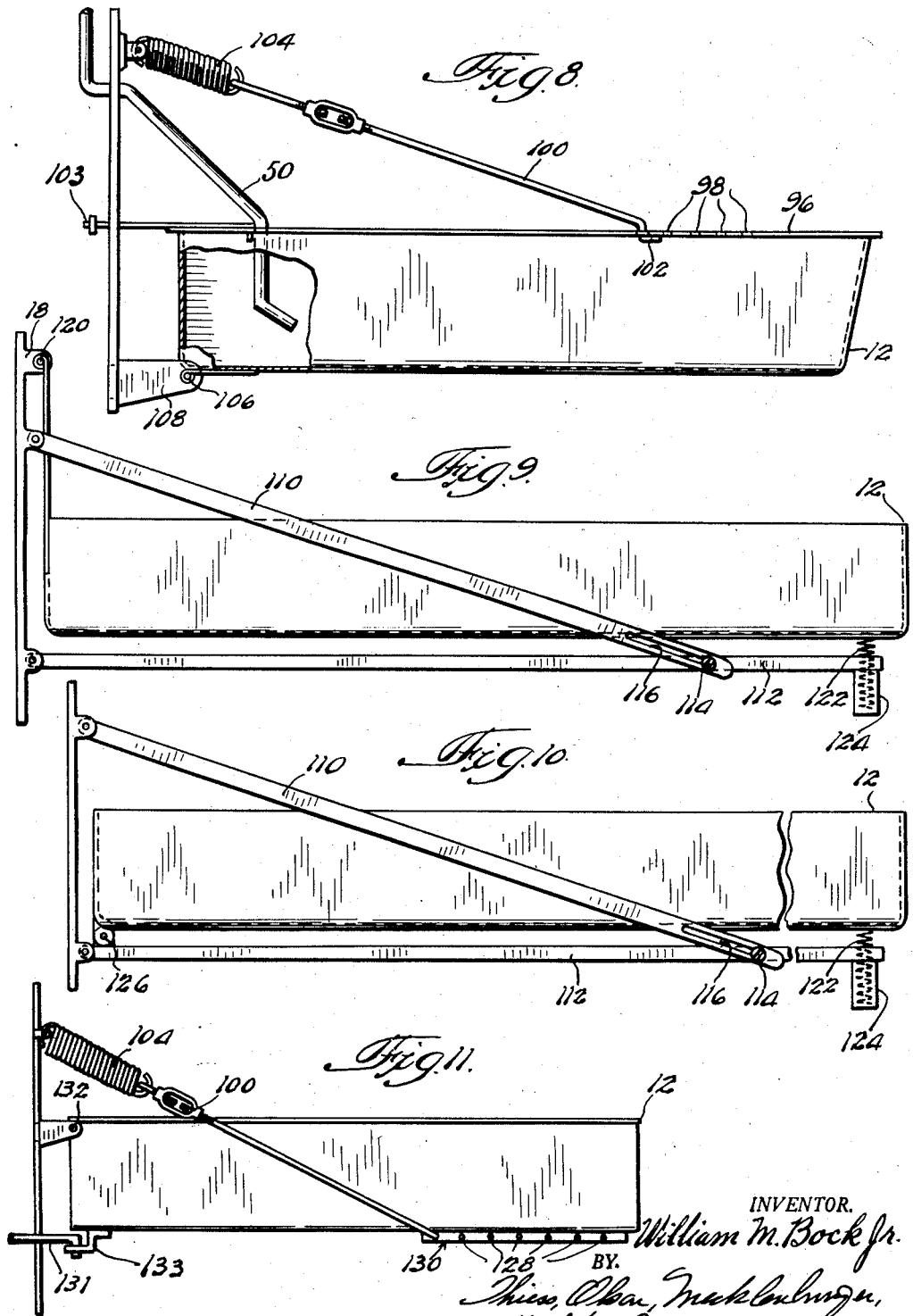

United States Patent Office 2,845,944
Patented Aug. 5, 1958

2,845,944

HUMIDIFIER

William M. Bock, Jr., Milwaukee, Wis.

Application April 5, 1955, Serial No. 499,315

3 Claims. (Cl. 137—408)

The present invention relates to humidifiers for use in industrial or domestic ovens or heating systems, such as gravity or forced air types or the like, and, more particularly, pertains to an automatically refillable humidifier construction which is not affected in efficiency of operation by deposits and encrustations of minerals commonly found in water.

The automatically refillable humidifier usually employed utilizes a float valve which is in the continual process of opening and closing in the course of allowing, at any one time, only a minute amount of water to enter the evaporating pan. The extended periods of time during which the valve is open, or partially open, enables mineral deposits to build up on the valve mechanism eventually preventing the effecting of a fluid seal by the closure member of such mechanism. The extended periods of time during which the closure member is removed, or slightly removed, from the seat also hastens the wearing away of the valve seat by fluid flow and necessitates a replacement thereof after a comparatively short period of operation. In addition, the float portion of a float valve is oftentimes deleteriously affected by the water and deteriorates within a short period of time. In addition, the float oftentimes becomes water-logged, thereby resulting in the valve continually assuming an open position and flooding the adjacent area.

To eliminate these problems which accompany float valve operation, applicant has provided a humidifier construction employing a quick opening and closing valve which remains in fully open position only for the minimum time necessary to allow water to fill the reservoir or evaporating pan. Consequently, the problems of mineral encrustations on and erosion of the various parts of the valve mechanism are minimized.

In addition, it is readily appreciated by those familiar with the humidifier art that mineral deposits and encrustations also tend to build up on the reservoir receptacle, thereby enabling a lesser and lesser amount of water to be present therein at any time and also impairing the heat conductive characteristics of the receptacle. Since the depositions of the minerals is inevitable, it is another object of this invention, therefore, to reduce the deleterious effect of mineral build up on the reservoir receptacle by providing a removable liner therefor which may be readily removed, discarded and replaced when required. The liners are rust resistant and of low unit cost. In addition, the following objects are to be attained with the improved construction.

The humidifier apparatus provided by this invention is so constructed as to be readily and substantially completely mounted within the bonnet or plenum chamber of any type of furnace, oven, or like unit, notwithstanding the frusto-conical or planar surface configuration of such bonnet or plenum chamber.

The improved apparatus, when mounted in position, has substantially the whole thereof concealed and thereby detracts in no way from the external appearance of the unit on which it is mounted.

By having the humidifier substantially concealed within the interior of the unit, a further advantage results in that the apparatus is substantially tamperproof.

The humidifier construction provided also enables the water regulating valve to be disposed exteriorly of and at a distance from the heating chamber of the unit, thereby preventing the normal operation of the valve being adversely affected by the high temperatures of such chamber.

It is another object of the improved humidifier construction to utilize a frame and cover plate combination which is formed of flexible sheet material which may be readily flexed to conform to an underlying surface configuration, thereby preserving the symmetrical external appearance of the unit on which it is mounted.

It is still a further object of this invention to provide an improved humidifier construction wherein the water regulating valve thereof may be readily combined with a remotely disposed control means and wherein the maximum humidity which the improved humidifier construction can produce is either manually or automatically regulated.

It is still a further object of this invention to provide an improved humidifier which is simple and compact in construction, is easy to install, and which may be readily serviced without being removed from a heating chamber to which it is affixed.

These and other objects will become more apparent from the description, accompanying drawings and appended claims.

In one embodiment of this invention a reservoir or evaporating pan is provided which is pivotally mounted at one end limit on a frame member which is fixedly secured to and supported by the bonnet or plenum chamber of a heating unit. The pan, which extends into the interior of the bonnet, is spring biased to assume a substantially horizontal position when not filled with water. When the pan is filled with water, the weight of the latter causes the pan to pivot downwardly from its normal horizontal position and places the spring bias under compression. Upon evaporation of the water within the pan, the latter gradually pivots upwardly. A switch, affixed to a lever arm of the pan, is actuated into open and closed positions upon pivotal movement of the pan. Upon the pan describing a predetermined arc upwardly, which occurs during evaporation of the water, the switch is closed and an electrically controlled valve, which is interposed in a water conduit leading to the evaporating pan, is fully opened, causing the pan to become rapidly filled with water. As the pan fills with water, it describes a reverse arc and causes the switch to open which, in turn, deenergizes and closes the valve, upon the pan reaching a predetermined position of pivotal adjustment corresponding to the proper water volume for normal operation. The evaporating pan contains a removable liner to which access may be readily gained by removing the cover from the pan-supporting frame member. The frame cover is of thin flexible material and can be readily flexed to conform to the surface configuration of the frame.

For a more complete understanding of this invention reference should be had to the drawings, wherein Figure 1 is an enlarged side elevational view of one embodiment of the invention in which the evaporating pan is shown partially in section;

Fig. 2 is a fragmentary top plan view of the embodiment illustrated in Figure 1;

Fig. 3 is a fragmentary left side elevational view of the embodiment shown in Figure 1;

Fig. 4 is a fragmentary enlarged, exploded view clearly revealing the method of assembly of the water valve-actuating switch utilized in the subject humidifier apparatus;

Fig. 5 is a fragmentary perspective view reduced in size and partly in section showing the improved humidifier apparatus mounted within a frusto-conically-shaped bonnet of a furnace;

Fig. 6 is a fragmentary perspective view, similar to Fig. 5, but showing the improved humidifier apparatus positioned in a plenum chamber having planar sides;

Fig. 7 is an enlarged fragmentary, perspective view illustrating an alternative water valve-actuating switch for use with the improved apparatus; and Figs. 8 through 11 are side elevational views depicting modifications which may be utilized in supporting the evaporating pan of the improved humidifier apparatus.

Referring now to the drawings and, more particularly, to Fig. 1, an elongated water reservoir or evaporating pan 12 is depicted having a readily removable liner 14 snugly positioned therein. The pan 12 is of such thickness and composition as to readily transmit heat and, as will be noted from Figs. 5 and 6, may be positioned completely within any suitable heating chamber, such as a bonnet chamber 16, as illustrated in Fig. 5, of a furnace 18 having a curvi-linear surface configuration, or a straight sided plenum chamber 20 of a furnace 19, such as is illustrated in Fig. 6. Referring once more to Fig. 1, it will be noted that the pan 12 has secured to the elongated sides thereof a pair of supporting arm members 22. The members 22, in this instance, are secured to the pan by bolts 24 or other suitable means which threadably engage openings 21 formed adjacent the open end of the pan. The supporting arms 22 extend endwise from the pan and are in substantially parallel relation with respect to one another. The distal end 94 of each member 22 is angularly offset in the same relative direction for pivotally engaging a bracket 26, the latter being struck out from a frame 44 forming a part of the improved apparatus.

As will be more clearly seen in Fig. 4, the ends 94 of the arms 22 are maintained in pivotal engagement with the brackets 26 by cotter pins 28, which are inserted in pin apertures 30 positioned in the ends 94 of the arms after the ends have been inserted through such apertures 32.

A lug 34, which may be welded or otherwise suitably affixed to the central lower portion of the pan end surface, adjacent the frame 44, is interposed between the two supporting arm members 22 and pivotally engages an offset end of a threaded rod 36. The threaded shank of the rod accommodates a collar 38. A coil spring 40 encompasses the threaded shank of the rod and has one end thereof abutting collar 38. Oppositely disposed to the pin lug 34 is a similar lug 42 which is fixedly attached to the lower side of frame member 44. As will be noted from Figs. 1, 2, and 4, the frame 44 is composed of relatively thin gauge sheet metal and may be readily flexed manually to conform to an underlying exposed surface of the bonnet or plenum chamber (see Figs. 5 and 6). Pivotally connected to lug 42 is a second threaded rod 48, which is similar to rod 36, heretofore mentioned. Threadably mounted on the shank of rod 48 is a collar 46. Collar 38 or 46, when adjusted relative to rods 36 or 48, respectively, will vary the position of spring 40, thereby enabling the pan, when empty, to be adjusted to assume a substantially horizontal position.

Upon filling the pan 12 with water, the pan and its contents will force the spring 40 to compress, as the increasingly heavier pan pivots in a downward direction. When the pan and its contents reach the position shown by dotted line 52 in Fig. 1, the switch 56 carried on arm member 22 will open causing a solenoid actuated valve 54, interposed in conduit 50, to close and stop the flow of water from the main supply line 53.

In a normal installation, the valve 54 is interposed in the conduit 50, adjacent the main supply line 53 as shown in Fig. 5, and the switch 56 is connected to the solenoid for such valve by suitable electrical leads 55. The valve 54 employed is a quick acting type, and, by reason of its remote position, it is unaffected by the high furnace temperatures.

To actuate the valve 54 into the open and close positions, the mercury switch 56 may be utilized which is embraced by a bracket member 58 which is, in turn, affixed by means of bolt 62 to one end of an L-shaped or bell-crank lever 60, more clearly shown in Fig. 4. The opposite end limit of the L-shaped lever 60 pivotally engages an end of an elongated link 64 by means of a rivet 66 or other suitable means. An aperture 68 is formed at the center of lever 60 for threadedly or otherwise suitably receiving a stud 69 formed on a fork member 70. The bifurcated end 71 of member 70 embraces one arm member 22 and is actuated thereby during pivotal movement of the pan 12 about the brackets 26.

It is the purpose of the lever 60 to exaggerate the angular movement of the pan-supporting arm 22 and transfer this exaggerated angular movement to the mercury switch 56 and effect making or breaking of the circuit thereof. Consequently, in the normal course of operation, as water evaporates from the pan 12, spring member 40 forces the pan to arcuately move in an upward direction as the pan-supporting arm 22 pivots about brackets 26. As the arm 22 moves, the lever 60 also arcuately moves because of the pinned engagement at 66 of lever 60 with the elongated link 64 and the slidable engagement of the supporting arm 22 with the fork member 70. When the pan 12 has reached a predetermined arcuate position which corresponds to a minimum water content in the pan 12, the mercury in the switch 56 will complete the electrical circuit energizing solenoid valve 54 and opening the same, allowing water to enter the pan 12 through the conduit 50. As water enters the pan, the increased weight will force the pan to arcuately move in a reverse downward direction until the mercury in the switch has been actuated so as to break the electrical circuit and deenergize the solenoid valve 54, closing the same and stopping the flow of water into the pan 12.

The elongated link 64 is provided with a supporting arm aperture 72 and an arcuate slot 74, which is spaced therefrom and has its center of curvature coincident with the center of aperture 72. Slot 74 is adapted to receive a bolt 76, which fixedly secures the link 64 to the frame bracket 26 by engaging nut 78 after first traversing an aperture 80 formed in bracket 26. As will be noted from Fig. 5, the frame member 24 may often be positioned at an inclined angle so as to conform with the inclination of the supporting surface of a furnace bonnet, plenum chamber, etc. To compensate for this angular disposition of the frame 44, the elongated link 64, by means of the arcuate slot 74, is permitted to be horizontally disposed despite the inclined positioning of the frame and the bracket 26 connected thereto. Consequently, when the pan member 12 is initially inserted into the interior of the bonnet or plenum chamber, it is adjusted to the horizontal position by means of the movable spring-confining collars 38 and 46 illustrated in Fig. 1. Since the elongated link 64 and arm member 22 will be horizontally aligned, the lever member 60, interconnecting the two parts, must also from necessity have its lower leg 84 horizontally disposed with fork member 70 engaging supporting arm 22. Upon an arcuate movement of the pan 12, the lever 60 will pivot about pin 66 in a downward direction during the filling operation, or in an upward direction during the evaporation process.

An alternative switch means which comprises a microswitch is illustrated in Fig. 7. An aligning link 31 functions similarly to the elongated link 64, illustrated in Fig. 4, in that it enables the switch 33 to be horizontally disposed despite the inclined disposition of the frame 44 and the bracket 26 affixed thereto, which pivotally supports the aligning bracket 31. A washer 35 is traversed by the distal end 94 of a supporting arm 22 and secures the engagement between the arm and the link 31. A bolt member 37 traverses an arcuate slot 39 formed in the bracket 31 and enables the bracket to be horizontally aligned despite the angular disposition of frame 44.

The microswitch 33 may be installed on the bracket 31 with a strip of suitable insulating material 41 interposed therebetween and is secured to the aligning bracket 31 by means of the nut and bolt assemblies 43. A U-shaped trip 45 is fixedly secured to a supporting arm member 22 and thus arcuately moves therewith. The opposed arms 47 of trip 45 alternately abut protruding fingers 49 and 51 of the switch 33 upon arcuate movement of the evaporating pan 12 in opposite directions about brackets 26. When the pan 12 is depleted in water content, it will arcuately rise in an upward direction enabling the upper finger 49 of the switch to extend outwardly and the lower finger 51 of the switch to be retracted, thereby completing the electrical circuit which energizes the solenoid valve 54 and allows water to flow into the pan 12 through the conduit 50. Conversely, after receiving the predetermined volume of water, the weight of the pan will force it to describe a reverse arc in a downward direction enabling the upper finger 49 to be retracted and the lower finger 51 to be extended so as to break the electrical circuit and deenergize the solenoid valve 54. It is thus seen from the modifications illustrated in Figs. 4 and 7 that a number of different types of switches may be utilized in the improved apparatus which will function to equal advantage in regulating the flow of water to the evaporating pan 12 by controlling the electrically operated valve 54 interposed in the water conduit.

Referring now to Fig. 3, it will be noted that the frame 44 is affixed to the bonnet or plenum chamber surface 86 by a plurality of symmetrically arranged screws 88 or other suitable means. As heretofore mentioned, the frame 44 is of relatively thin gauge metal and capable of being flexed to conform to the underlying surface. Similarly, cover 90, which is surmounted over the frame, may be removably affixed to the underlying frame 44 by means of projecting studs 92, affixed to the cover 90 and snap-in lugs 93 adapted to receive the upper edge of the cover. The cover member also is of thin gauge metal, thereby enabling it to be flexed to conform with the remaining surface 86 and preserve the symmetry thereof. The switch leads 55 pass through the insulating sleeves 57 mounted on the frame 44. It will be noted from Fig. 2 that the two arm members 22 have their distal ends 94 offset in the same relative direction to facilitate insertion into the bracket members 26. Thus, in the course of assembly or disassembly, all that need be done is to simultaneously insert ends 94 through the bracket apertures 32 and insert the cotter pins 28 in the arm apertures 30.

Figs. 8, 9, 10, and 11 illustrate other means for adjusting the evaporating pan 12 to a horizontal position and other means for arcuately moving the pan upon evaporation of its liquid contents. These alternative structures lend themselves to large volume evaporating pans. In Fig. 8, the pan 12 has a flange 96 which is apertured at 98 along the flange edge. The supporting arm 100 has a hooklike end limit 102 which engages the apertures 98 at one end limit and the spring member 104 at the oppositely disposed end limit. The pan is pivotally mounted at 106 to the supporting bracket 108. Upon evaporation of water contained therein, pan 12 will be pulled in an upward direction by the spring 104 actuating a switch by means of a movable rod 103. The apertures 98 together with the rod adjustment function similarly as the elongated link 64 previously described in detail and enable the pan 12 to initially assume a horizontal position in the empty state.

Fig. 9 utilizes a supporting arm 110 which enables a supporting bracket 112 to assume a horizontal position by means of the bolt member 114, which rides in the elongated slot 116 and which fixedly positions arm 110 relative to the supporting platform 112 by tightening thereof. The pan 12 is pivotally mounted on the bracket 118 at 120 and effects arcuate movement by means of the spring member 122 which is socketed in the platform portion 124 and which engages the undersurface of one end portion of the pan 12. A control switch may be actuated by an arm member pivotally mounted at 120.

In Fig. 10, the pan 12 is supported by a construction similar to that illustrated in Fig. 9, except that the pan is pivotally mounted at 126 by means of a bracket affixed to the bottom of the pan rather than the top portion of the pan. A switch actuating arm may be engaged at 126.

In Fig. 11, a construction similar to that illustrated in Fig. 8 is provided, except that the arm-engaging slots 128 are positioned in a flange 130 disposed on the bottom portion of the pan 12. In addition, the slots or apertures 128 are positioned in a plane normally disposed to the bottom surface. Also, the pan 12 is pivoted at 132 at its upper portion rather than its lowermost portion. A switch actuating arm 131 may be engaged to the pan by means of bracket 133.

Although dissimilar in construction, the embodiments illustrated in Figs. 8 through 11 function in a similar manner upon evaporation of the water contained in the pan 12. The pan, because of the pull, or push, of the various spring members, is forced to pivot upwardly as the water evaporates.

Where it is desired to accurately control the maximum amount of humidity which can be produced by the improved humidifier construction, the latter, if desired, may be combined with a control such as a humidistat, which may be disposed remotely with respect to the heating chamber and be either manually or automatically adjustable. Such a control would be electrically connected in series relation with the solenoid forming part of the valve 54 and switch 33 or 56. With such a control, the aforedescribed circuit will be broken upon a predetermined humidity being reached in the area in which the control is situated. After the humidity within the given area has been reduced a given amount, the control may be of such construction as to automatically make or close the circuit for the switch and solenoid valve.

It is thus seen that a humidifier construction has been provided which utilizes a quick opening and quick closing valve, preferably of the solenoid type, whereby the valve closure member is removed from its seat the minimum time necessary to effect filling of the evaporating pans. In addition, the valve need not be positioned adjacent the evaporating pan and, consequently is unaffected by high temperatures of the heating chamber. It is obvious that, by being removed from its valve seat a minimum amount of time, encrustations on the seat surface and seat erosion are held to a bare minimum, thereby adding materially to the valve life. As before mentioned, the pan 12 is provided with a removable liner 14, which may be of aluminum foil or other suitable material which readily transmits heat. Consequently, upon a build up of mineral deposits ordinarily dissolved in water on the pan liner, the cover 90 may be readily removed from the frame 44, the liner 14 and the deposits contained thereon quickly removed, and a new liner substituted therefor. The mineral deposits, in addition to the other problems they present, are insulating in character and lessen the humidifier efficiency by requiring a greater heat input. It is apparent that the life of the pan 12 will be increased indefinitely. As has also been previously mentioned, the frame 44 and the cover 90 are composed of thin gauge metal and may readily be flexed to conform to the general surface configuration of the supporting member.

As is obvious from the embodiments illustrated, in Figs. 8 through 11, many modifications may be effected in the illustrated humidifier construction and still remain within the basic inventive concept herein disclosed. The invention is, therefore, limited only by the scope of the appended claims.

I claim:

1. A humidifier construction comprising a pivotally mounted evaporating pan, a removable liner therefor, conduit means in fluid communication with said pan and with a source of fluid supply, said evaporating pan assuming uniform pivotal angular dispositions when filled with predetermined volumes of fluid from said fluid supply source, valve means interposed in said conduit means, a relatively stationary frame having brackets extending therefrom, two elongated supporting arms carried by said pan and in pivotal engagement with said brackets, a lever member of substantially L-shaped configuration having one end thereof operatively connected to one of said brackets, means affixed to said L-shaped lever and in slidable engagement with one of said supporting arms for effecting simultaneous movement of said lever and said supporting arm, and control means for said valve means actuable in accordance with its angular disposition supported by the second end of said L-shaped lever whereby said control means angular disposition is dependent upon the angular disposition of said pan supporting arms.

2. A humidifier construction comprising a pivotally mounted evaporating pan, support arms therefor pivotally mounted in a fixed support, a removable liner for said pan, conduit means in fluid communication with said evaporating pan and a source of water supply, said evaporating pan assuming uniform pivotal angular dispositions when filled with predetermined volumes of fluid from said fluid supply source, electrically actuated valve means interposed in said conduit means, control means electrically connected to said valve means for actuating the same, pivotal lever means having a first distal arm portion on which said control means is mounted, a fixed supporting surface on which said lever means is mounted by means of a second pivotal arm portion, and interconnecting means secured to said second arm portion slidably engaging one of said pan support arms whereby said control means angular disposition is directly dependent on said pan arms angular disposition.

3. A humidifier construction comprising a pivotally mounted evaporating pan, support arms therefor pivotally mounted in a fixed support, conduit means in fluid communication with said evaporating pan and a source of water supply, said evaporating pan assuming uniform pivotal angular dispositions when filled with predetermined volumes of fluid from said fluid supply source, electrically actuated valve means interposed in said conduit means, control means electrically connected to said valve means for actuating the same, pivotal lever means having a first distal arm portion on which said control means is mounted, a fixed supporting surface on which said lever means is mounted, means for magnifying the angular movement of said pan support arms and transmitting said latter angular movement to said first distal arm portion of said pivotal lever means whereby said control means angular disposition is directly dependent upon said pan arms angular disposition.

References Cited in the file of this patent

UNITED STATES PATENTS

| | | |
|---|---|---|
| 153,000 | Kelly | July 14, 1874 |
| 1,415,178 | Imschweiler | Mar. 9, 1922 |
| 1,778,573 | Thiele | Oct. 14, 1930 |
| 2,708,435 | Lewis | May 17, 1955 |